June 6, 1967 C. VAN OSENBRUGGEN ETAL 3,324,276

SPARK EROSION APPARATUS AND METHOD OF REMOVING THIN METAL LAYERS

Filed April 15, 1963

INVENTORS
CORNELIS VAN OSENBRUGGEN &
ADRIANUS G. VAN DORSTEN
BY
Frank R. Trifari
AGENT

United States Patent Office 3,324,276

Patented June 6, 1967

3,324,276

SPARK EROSION APPARATUS AND METHOD OF REMOVING THIN METAL LAYERS

Cornelis van Osenbruggen and Adrianus Cornelis van Dorsten, Emmasingel, Eindhoven, Netherlands, assignors to North American Philips Company, Inc., New York, N.Y., a corporation of Delaware Filed Apr. 15, 1963, Ser. No. 273,078
Claims priority, application Netherlands, Apr. 19, 1962, 277,476
12 Claims. (Cl. 219—69)

The invention relates to a method of, and apparatus for, removing a part of a thin metal layer from the surface of a body composed of an insulator material or a semiconductor material.

In various fields of technology it often occurs that accurately defined dimensions or an accurately determined size depending upon the properties of the base are required of such a metal layer. The manufacture of such a metal layer presents great difficulties especially when the usual mechanical working techniques are employed. If the base is comparatively thin and brittle, it is practically impossible to manufacture such a device without damaging the underlying base. It is clear that in the case where the base is only a few microns thick, the base is apt to be cracked by sandblasting or etching of the metal layer provided on it.

An object of the invention is to facilitate the removal of selected portions of a metal layer from a body.

Another object of the invention is to provide a method of, and apparatus for, removing thin metal films quickly and without damage to the supporting surface of a thin underlying body In order to mitigate the drawbacks of the prior art devices, the invention is characterized in that the removal is carried out by spark erosion between two electrodes, a conductive pin serving as the one electrode and the thin metal layer serving as the other electrode.

According to a further feature of the invention, the conductive pin is given a comparatively rapid rotary movement in addition to a comporatively slow movement over the base.

Owing to the comparatively rapid rotary movement, the removal of the metal layer occurs regularly, because the influence of unevennesses in the pin and/or in the part of the metal layer opposite to the pin is eliminated. During the pin rotation the distance between the electrodes, which is variable as a result of the unevennesses, varies in a manner such that the conditions for producing a spark discharge are satisfied at any point of the layer.

Figure 1:
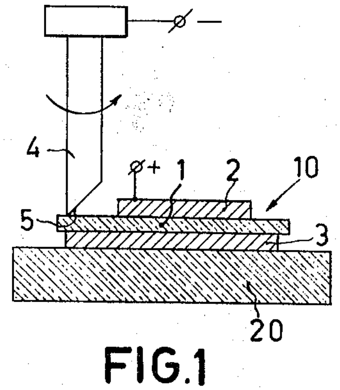
Figure 2:
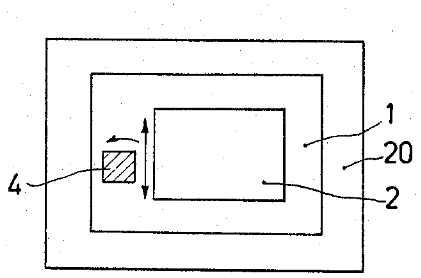

In order that the invention may readily be carried into effect, an example of an embodiment of the invention will now be described more fully, by way of example, with reference to the accompanying drawing, in which, FIGS. 1 and 2 show the processing of one of the electrodes of a precision capacitor.

In these figures, reference numeral 1 designates the body of a precision capacitor 10 on which electrodes 2 and 3 are preferably provided by means of vapour-deposition techniques. The capacitor 10 itself is provided on a carrier 20, for example, of glass. It is not readily possible to give a series of precision capacitors immediately the desired capacitance. For, the material of the body 1 often will not be reproducible in composition or it will not have the same thickness everywhere. Therefore, the capacitance of the capacitor 10 is purposely made larger than the ultimately desired capacitance and then part of the thin metal layer 2 and/or 3 is removed to obtain the exact value of capacitance desired.

If the body 1 is comparatively thin, the chemical methods for removing a part of the relative metal layer are not recommendable. According to the invention, a part of the metal layer 2 is removed by spark erosion. A voltage is applied between an electrode 4 and the metal layer 2, so that a spark discharge occurs parallel to the body 1. The voltage at the layer 2 is chosen positive with respect to that at the electrode 4, because at a spark discharge the electrode which is at the higher voltage erodes more than the electrode at the lower voltage.

According to a further feature of the invention, a comparatively rapid rotation of the electrode 4 is superimposed upon the comparatively slow motion of the electrode 4 over the capacitor 10. Also owing to the preferably sharp point 5 of this electrode there is a variable distance from the electrode 4 to the metal layer 2 at each position of the electrode 4 and at any point of the metal layer. During the comparatively slow translation movement of the electrode 4, the electrode continuously being in contact with the body 1, there consequently always is a distance which is favourable for the formation of a spark discharge. The erosion of the layer 2 consequently occurs regularly.

In one embodiment the capacitor 10 was a quartz capacitor of a diameter of 20 mm. The thickness of the quartz body was $1\mu$. The thickness of the metal layers 2 and 3 was $2\mu$. By means of spark discharges between the metal layer 2 and the electrode 4, which had a translation speed of 0.1 mm./sec. and a rotation speed of 1 rotation per second, the layer 2 was reduced to a diameter at which the capacitor 10 had a desired capacitance of 10,000 pf.

Besides being used for the manufacture of precision capacitors, this method is also suitable for manufacturing, for example, a large resistance on a small surface, in which by spark erosion a flat conductive spiral having a pitch of a few microns can be manufactured on an insulating carrier. Another use is the manufacture of frames for optical image amplifiers. On a thin insulating carrier, on which a thin metal layer is provided by vapour-deposition, parallel strips, for example, $10\mu$ thick are make by spark erosion at a distance of $10\mu$.

What is claimed is:

1. A spark erosion method of removing selected parts of a thin metal layer from a body composed of a material having a resistivity which is substantially higher than that of common electrical conductor materials comprising, positioning a pin-shaped electrode having a non-symmetrical point in close proximity to an edge of said metal layer but laterally spaced therefrom to define a spark discharge gap therewith, establishing a voltage between said electrode and said metal layer, relatively moving said electrode with respect to said layer along a path which is spaced from the edge of the layer, and rotating said electrode at a relatively rapid rate to cause a series of spark discharges across said gap for eroding said selected parts of the metal layer.

2. A method as described in claim 1 wherein the material of said body is selected from the group consisting of insulator materials and semiconductor materials.

3. A method as described in claim 1 wherein the longitudinal axis of said electrode extends perpendicular to the plane of said metal layer.

4. A method as described in claim 1 wherein said voltage is derived from a source of direct voltage having its positive terminal connected to the metal layer and its negative terminal connected to the electrode.

5. A spark erosion of removing selected parts of a thin metal layer from a thin body composed of a material selected from the group consisting of insulator materials and semiconductor materials comprising, bringing a pin-shaped electrode having a non-symmetrical point and an edge of said metal layer into close proximity at places where parts of the metal layer are to be removed so as to define a spark discharge gap, applying a direct current voltage between said electrode and said metal layer of a polarity such that said metal layer is positive with respect to said electrode thereby to cause a spark discharge across said gap for eroding the said parts of the metal layer, and relatively moving said electrode with respect to said layer along a path that is spaced from said edge of the metal layer while simultaneously rotating said electrode at a speed that is comparatively fast relative thereto.

6. A spark erosion method of removing selected parts of a thin layer of electrically conductive material from a body composed of a material which is relatively non-conductive comprising, bringing a pin-shaped electrode having a non-symmetrical sharpened point into close proximity to an edge of said metal layer but laterally spaced therefrom to define a spark discharge gap therewith, establishing a voltage between said electrode and said metal layer to cause a spark discharge across said gap for eroding the said parts of the metal layer, and rotating said electrode about its longitudinal axis, at a relatively rapid rate while moving said electrode along a path which is approximately parallel to said edge of the metal layer thereby to produce a spark discharge which is parallel to said body.

7. A method as described in claim 6 wherein said non-conductive material is selected from the group consisting of insulator materials and semiconductor materials and wherein the sharpened point of said electrode is non-symmetrical with respect to its longitudinal axis and said sharpened point is brought into proximity of said metal layer.

8. A method as described in claim 7 wherein said electrode is brought into a position proximite said layer so that its longitudinal axis extends perpendicular to the plane of the layer and wherein said electrode is moved along a path which is perpendicular to said axis.

9. A spark erosion device for removing selected parts of a thin metal layer from the surface of a body composed of a material having a resistivity which is substantially higher than that of common electrical conductor materials comprising, means for supporting said body, a pin-shaped electrode having a non-symmetrical sharpened point and positioned in close proximity to an edge of said metal layer but laterally spaced therefrom to define a spark discharge gap therewith, means for applying a direct current voltage between said electrode and said metal layer of a polarity such that said metal layer is positive with respect to said electrode, said electrode being rotatable about its longitudinal axis at a relatively rapid rate and being relatively movable with respect to said layer along a path which is spaced from the edge of the layer.

10. A device as described in claim 9 wherein said electrode point is sharpened so as to be non-symmetrical with respect to the longitudinal axis of the electrode and wherein said electrode is simultaneously rotated about said axis and moved in a path laterally spaced from the edge of said metal layer.

11. A spark erosion device for removing selected parts of an electrically conductive metal film from the surface of a flat body composed of a semiconductor material or an insulator material comprising, means for supporting said body, a pin-shaped electrode having a non-symmetrical sharpened point and positioned with its longitudinal axis perpendicular to said surface and in close proximity to an edge of said metal film but laterally spaced therefrom to define a sharp discharge gap therewith, means for applying a direct current voltage between said electrode and said metal layer of a polarity such that said metal layer is positive with respect to said electrode, said electrode being rotatable about its longitudinal axis at a rapid rate and being movable laterally in a given path on said body which is spaced from said metal film thereby to produce a spark discharge which is parallel to the surface of said body.

12. A device as described in claim 11 wherein the point of said electrode is positioned so that it follows a path which is substantially within the plane of said metal film and wherein the speed of rotation of the electrode is comparatively fast relative to the speed of lateral movement thereof.

References Cited

UNITED STATES PATENTS

| | | | |
|---|---|---|---|
| 2,248,057 | 7/1941 | Bond | 219—69 X |
| 2,377,159 | 5/1945 | Kurtz et al. | 219—69 X |
| 2,785,280 | 3/1957 | Eisler et al. | 219—69 |
| 2,884,313 | 4/1959 | Browne | 219—69 X |
| 3,067,317 | 12/1962 | Buro | 219—69 |

RICHARD M. WOOD, *Primary Examiner.*

R. F. STAUBLY, *Assistant Examiner.*